(12) United States Patent
Halsey

(10) Patent No.: US 8,608,421 B1
(45) Date of Patent: Dec. 17, 2013

(54) NUT TIGHTENING SYSTEM

(71) Applicant: John T. Halsey, Pensacola, FL (US)

(72) Inventor: John T. Halsey, Pensacola, FL (US)

( * ) Notice: Subject to any disclaimer, the term of this patent is extended or adjusted under 35 U.S.C. 154(b) by 0 days.

(21) Appl. No.: 13/730,663

(22) Filed: Dec. 28, 2012

(51) Int. Cl.
*F16B 39/10* (2006.01)
(52) U.S. Cl.
USPC .............................. 411/204; 411/6; 411/262
(58) Field of Classification Search
USPC ............ 411/6, 204, 207, 211, 213, 262, 299, 411/431, 433, 438
See application file for complete search history.

(56) References Cited

U.S. PATENT DOCUMENTS

| | | | |
|---|---|---|---|
| 900,589 A * | 10/1908 | Ratcliffe | 411/262 |
| 1,089,607 A * | 3/1914 | Vincent | 411/246 |
| 1,104,731 A * | 7/1914 | Heimar | 411/299 |
| 1,502,555 A * | 7/1924 | Eklund | 411/262 |
| 1,630,958 A * | 5/1927 | Mauch | 411/252 |
| 2,690,682 A * | 10/1954 | Passman | 74/441 |
| 3,806,992 A | 4/1974 | Reimer | |
| 4,345,863 A * | 8/1982 | Mochida et al. | 411/252 |
| 4,721,306 A | 1/1988 | Shewchuk | |
| 5,364,214 A | 11/1994 | Fazekas | |
| 5,449,259 A * | 9/1995 | Clohessey | 411/262 |
| 5,522,688 A | 6/1996 | Reh | |
| 5,540,530 A | 7/1996 | Fazekas | |
| 6,015,251 A * | 1/2000 | Chung | 411/252 |
| 7,037,060 B2 | 5/2006 | Commins | |
| 7,905,066 B2 | 3/2011 | Pryor | |
| 2007/0001451 A1 | 1/2007 | Struven | |
| 2009/0324364 A1 | 12/2009 | Smith | |
| 2011/0113711 A1 | 5/2011 | Espinosa | |
| 2011/0176887 A1* | 7/2011 | Im | 411/262 |

\* cited by examiner

*Primary Examiner* — Roberta Delisle
(74) *Attorney, Agent, or Firm* — Joe D. Calhoun

(57) ABSTRACT

A device for applying rotational torque to a fastener (such as a nut) on a fastening member (such as a threaded rod) to maintain the tight fastening. One specific embodiment of the device uses a recoil spring to apply such torque directly to the fastener; the device enables continued tightening of the fastener long after the initial fastening occurs.

21 Claims, 10 Drawing Sheets

NUT TIGHTENING SYSTEM

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

This invention generally relates to a device to maintain tightness betweenone or more substrata or structural elements and a fastener, often associated with afastening member running through or anchoring one or more of the structural elements. More particularly, this invention relates to a self-tightening nut system or to a system for rotating a nut or other rotary fastener on the threaded tip of a rod, bolt or similar fastening member, to maintain the tight structural integrity of the fastened structural elements.

(2) Background of Invention

There are many situations requiring application of rotational torque upon a fastener, to maintain the tightness of the fastening long after the initial fastening. One example of such a situation involves the need to tighten a nut fastening two structural elements together after one or both structural elements have shrunken from dehydration. For example, lumber used for construction materials typically contains higher moisture when the structure is first constructed, compared to the moisture content after the structure has been constructed for a period of time. This is especially true when the lumber has been newly treated with preservatives and chemicals to withstand moisture. The internal moisture content of the wood construction elements decreases with the passage of time. This process, along with the compression caused by the weight of the structure bearing down on the wood units, eventually results in the shrinkage of the wood units (sometimes called "settling"). The process is most active during the first couple of years, and can result in a 5-6% decrease in the dimensions of wood units; then the process continues for several more years at a slower rate. As a result, many wooden units attached to each other lose their tight connections, thereby potentially creating a danger during the occurrence of catastrophic events such as hurricanes, tornadoes, strong wind and storms, or earthquakes. Maintenance of the tight connections will reduce or prevent damage caused by the repetitive shaking of the structures during the aforementioned catastrophic events.

Typical construction methods include anchoring the wooden frame of a structure to the footing or foundation of the structure. One such method includes a rod, anchored to the foundation and extending upward through the lower horizontal bottom plate of the wall frame, then continuing upward through the uppermost wooden top plate of the wall frame and terminating in a washer and nut tightened atop the top plate. As the structural frame dries over time, shrinkage/shortening of the wall studs and top plates often results in a gap of at least three-eighths (⅜) inch per floor between the top plate and the once-tight nut. (The weight of the roof and sheetrock also contributes to this gap.) Such gaps enable high winds to vibrate or move the structure or its walls on its foundation; such "play" can damage the structure or, in extreme instances, eventually result in destruction of the structure.

A wide variety of tie-down or take-up systems have been developed to assure that the structural elements remain tightly connected. Known in the art are the following patents and published applications, arguably related to the patentability of the present invention:

| U.S. Pat. No./application Ser. No. | 1st Named Inventor | Date of Patent/Publication |
|---|---|---|
| 3,806,992 | Reimer | Apr. 30, 1974 |
| 4,721,306 | Shewchuk | Jan. 26, 1988 |
| 5,364,214 | Fazekas | Nov. 15, 1994 |
| 5,522,688 | Reh | Jun. 4, 1996 |
| 5,540,530 | Fazekas | Jul. 30, 1996 |
| 7,037,060 B2 | Commins | May 2, 2006 |
| 2007/0001451 A1 | Struven | Jan. 4, 2007 |
| 2009/0324364 | Smith | Dec. 31, 2009 |
| 7,905,066 | Pryor | Mar. 15, 2011 |
| 2011/0113711 A1 | Espinosa | Jul. 20, 2010 |

U.S. Pat. Nos. 5,364,214 and 5,540,530 issued to Fazekas disclose a self-adjusting tie-down system having a spring as a retainer, rather than to tighten the nut. These patents disclose a pair of opposing wedges that slide relative to each other, to increase in height to occupy any gap that arises between the nut and the top plate.

U.S. Pat. No. 7,037,060 issued to Commins discloses a shrinkage compensator assembly having an internal compression spring interposed between an innermost base cylinder and an outer sliding cylinder, to urge the sliding cylinder upward to increase the height of the assembly.

U.S. patent application Publication Ser. No. 11/447,637 filed by Stuven discloses a spring loaded nut for retaining a tubing connection with the tapered end of a vessel fitting. A compression spring within the nut housing biases a ferrule to maintain the tubing in tight engagement with the tapered end of the vessel fitting, to prevent leakage from the vessel through the fitting.

U.S. patent application Publication Ser. No. 12/309,547 issued to Smith discloses a self-adjusting shrinkage compensation device having four nut segments around a threaded rod, and coiled spring members flexibly holding the segments against the rod.

None of the above listed patents expressly discloses a device for tightening the rotary fastener (such as a nut) on the threaded tip of the fastening member (such as a threaded rod), for maintaining a tight connection between the structural element(s) associated with the rotary fastener and the fastening member, wherein said device includes a spring-powered tightening means applying rotational force directly to a coupling means for rotating the rotary fastener.

BRIEF SUMMARY OF THE INVENTION

The invention is essentially a device for assuring that a nut remains tight against the washer and top plate or similar structural elements or substrata, as the structural frame shortens. Although the invention has several embodiments, one general embodiment comprises a self-tightening rotary fastener (such as a nut) for the externally threaded portion of the fastening member (such as a threaded rod), for maintaining a snug fastening between said fastener and the substratum associated therewith. In this embodiment, said fastener includes an internally threaded fastener means rotationally engageable with the fastening member; also included are a tightening means for applying rotational force directly to said fastener means, and a stop means for preventing counter-rotation of said tightening means in a tightened state.

Alternatively, it essentially is a system for rotating a standard nut on the threaded tip of an anchored rod to maintain tight contact between the nut, washer and top plate. In general, the system comprises (includes) a device for tightening the rotary fastener (such as a nut) on the threaded tip of the fastening member (such as a threaded rod), for maintaining a tight connection between the structural element(s) associated with the rotary fastener and the fastening member, said device comprising:

(a) a coupling means for coupling the device to the rotary fastener;

(b) a tightening means for applying rotational force directly to said coupling means for rotating the rotary fastener; and (c) a chocking means for chocking and unchocking said tightening means in a rotated state. The invention may further include a stop means for preventing rotation of said tightening means after unchocking of said chocking means.

Another embodiment of the invention includes, in general:

(1) a nut rotatingly travelable above the threaded tip of the rod, the nut having an outer configuration for spooling wire wound around the nut;

(2) a wire, attached at one end to the spooling-nut, and wound around the spool in the same direction as the threads of the nut so that unwinding pulling of the wire will cause tightening rotation of the nut down the threaded tip of the rod; and (3) an extension spring having one end connected to the unattached end of the spooled wire, and having an opposite second end anchored a sufficient distance away to stretch the extension spring an amount sufficient to unwindingly pull the spooled wire enough to rotate the spooling-nut enough to maintain tight contact with the substratum. To deploy this embodiment of the self-tightening system, the user winds the wire around the spooling-nut (in the same direction as the threads), then screws the spooling-nut down the end of the threaded rod until it tightly abuts the washer on the top plate. The user then anchors the spring actuation mechanism (either extension spring or recoil spring-nut), and attaches the free end of the wound wire to the spring actuation mechanism. As the treated lumber dries and shrinks, the spring actuation mechanism causes the nut to rotate and maintain its tightened abutment against the washer on the top plate.

One primary object of the present invention is to provide an uncomplicated means of continuing the direct application of rotary torque to a fastener after the initial tightening of the fastener.

Another benefit of the invention disclosed herein is to provide a self-tightening system that is easy to make and use.

Another benefit of the present invention is to provide a system to maintain snug contact between the nut and top plate (or a washer), which may be anchored by a threaded rod through the bottom plate to the foundation.

DETAILED DESCRIPTION OF THE INVENTION

For the sake of simplicity and to give the claims of this patent application the broadest interpretation and construction possible, the following definitions will apply:

The term "chock" or derivative thereof essentially means to stop, especially to stop the rotation of an element around an axis.

The term "fastener" or derivative thereof essentially means any fastener rotationally engageable with another fastening member, such as (for example) a nut with a threaded rod.

The term "threaded rod" or derivative thereof essentially means an externally threaded element or portion thereof capable of accepting rotational engagement of the internally threaded portion of a nut or similar fastener; it may be an element that is entirely threaded, or a bolt or a portion thereof having external threading.

The term "stanchion" or derivative thereof essentially means any element that may function as a stationary post or support.

Figure 1:
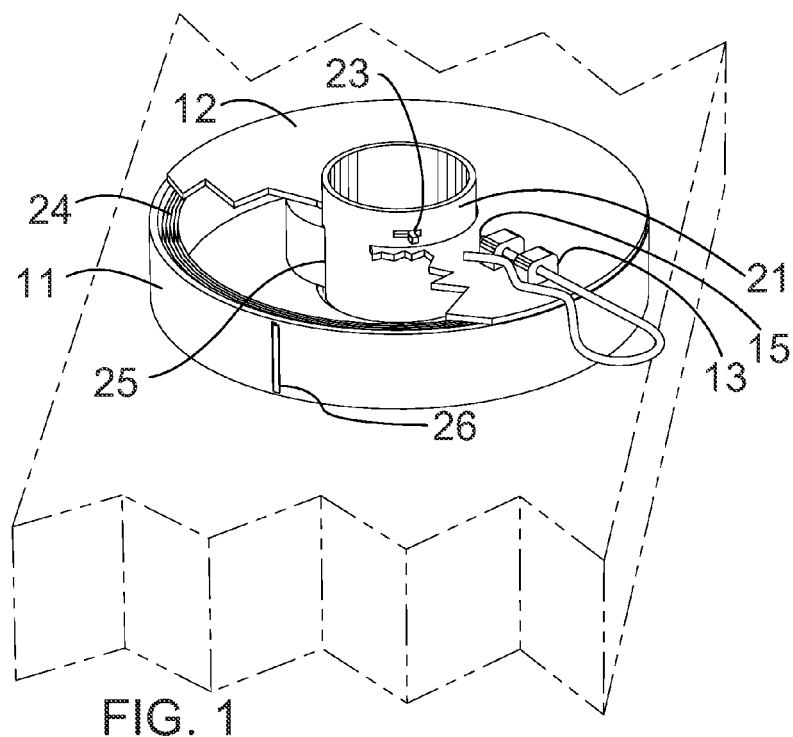
FIG. 1 depicts a perspective view of a representative sample of the invention mounted on a nut (not shown) anchoring a horizontal structural element or substratum (dashed lines). The device includes a recoil spring (24), within a housing (11) rotatably impaled upon an axle portion (21) of a coupling member having a coupling end (22) defining a coupling cavity (not shown); the housing lid has been partially removed to show that this recoil spring is in a relatively uncoiled state, having its inner end (25) anchored to an axle-slot (27) in the axle portion, and having its outer end (26) anchored to a housing-slot (28) in its housing. The axle portion includes a chocking means for temporarily chocking rotation of the housed recoil spring around the coupling member; this embodiment of the chocking means includes a flange (23) outstanding from the axle portion, and at least one yoke (13) fixed to the housing and having a bore accepting a chock-pin having a axial tip (15) engageable with the flange.
Figure 2:
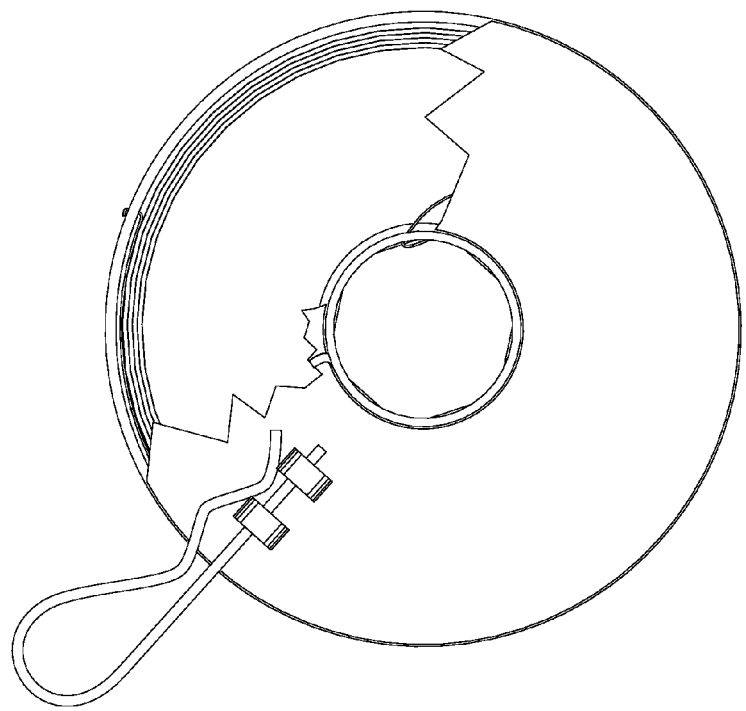
FIG. 2 depicts a top plan view of the invention of FIG. 1 (with its lid (12) partially cut away), absent the environmental elements.
Figure 3:
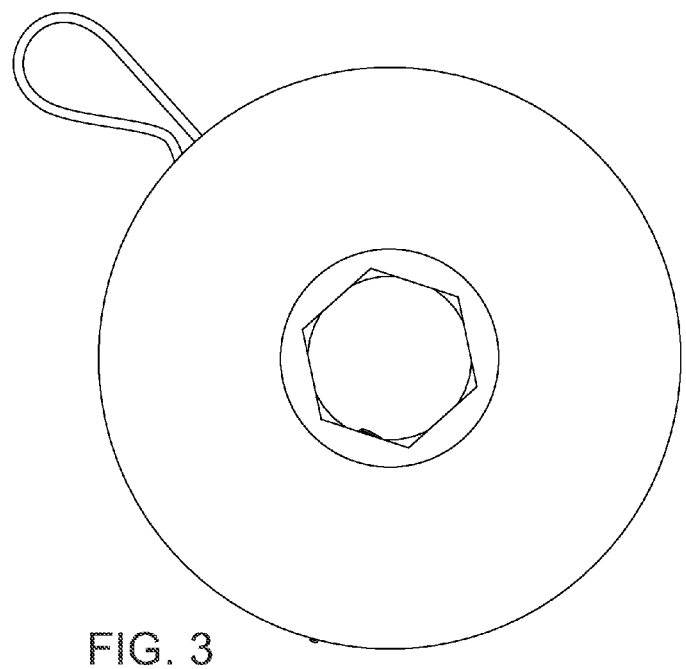
FIG. 3 depicts a bottom plan view of the invention of FIG. 1, absent the environmental elements.
Figure 4:
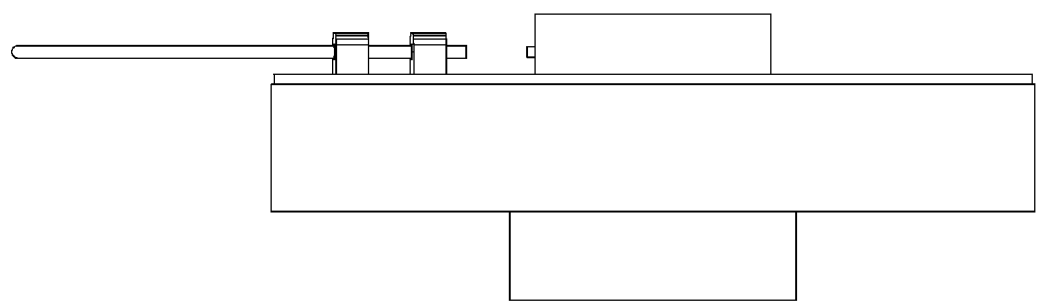
FIG. 4 depicts a first side elevation view of the invention of FIG. 1, absent the environmental elements.
Figure 5:
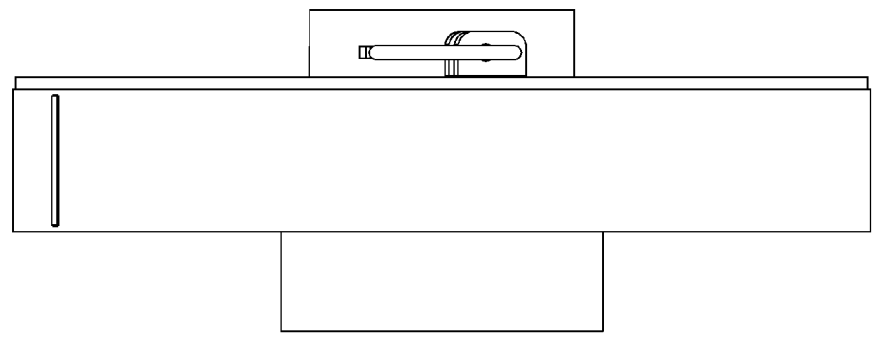
FIG. 5 depicts a second side elevation view of the invention of FIG. 1 (90° rotation from the view of FIG. 4), absent the environmental elements.
Figure 6:
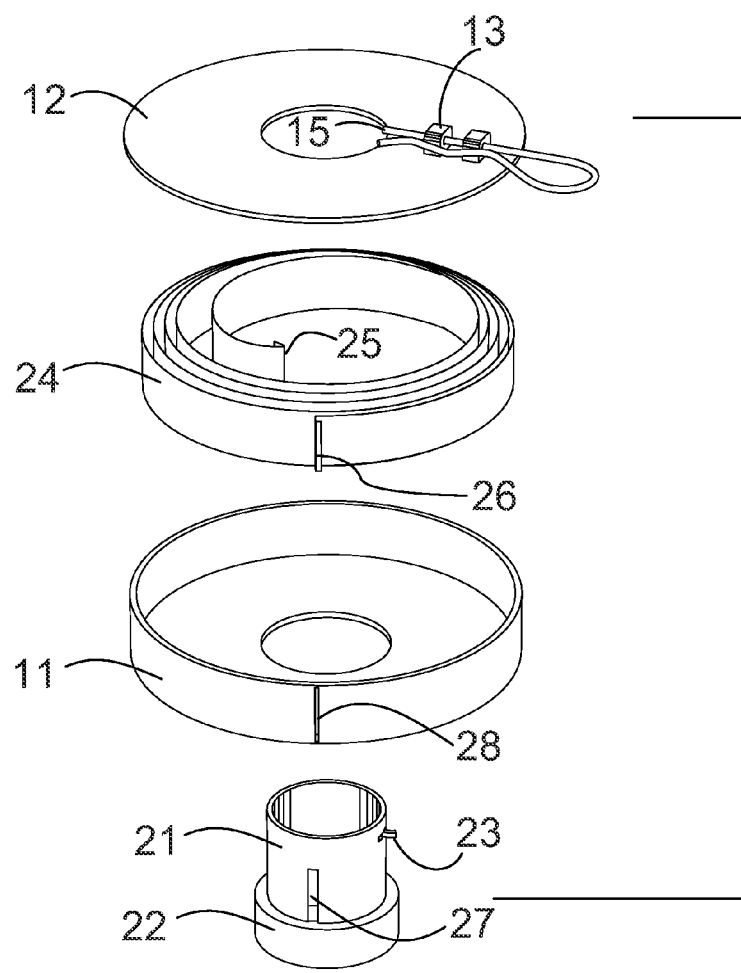
FIG. 6 depicts an exploded view of the parts of the invention of FIG. 1, absent the environmental elements. The lowermost part is a representative sample of a coupling portion having an axle slot (27) to accept the axial end of the recoil spring; the housing (11) (immediately above the coupling portion) includes a slot (28) accepting the peripheral end of the recoil spring.
Figure 7:
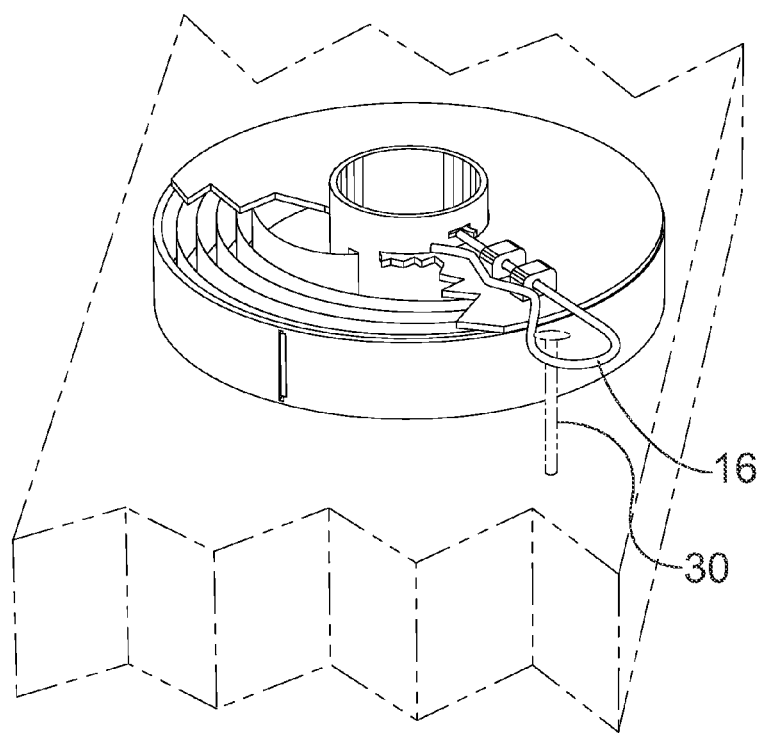
FIG. 7 depicts a perspective view of the invention of FIG. 1, with the recoil spring (24) in a tightly coiled state, with the axial tip (15) of the chock-pin engaged with the flange (23), and with the distal portion (16) of the chock-pin engaged with the stanchion (30). The device also includes a stop means for preventing rotation of the housed recoil spring relative to the horizontal structural element; this embodiment includes a stanchion (30) upstanding independently from the device and engageable with the distal portion (16) of the chock-pin, for preventing rotation of the housing after disengagement of the chock-pin from the flange, so that any torque will rotate the coupling portion to tighten the nut.
Figure 8:
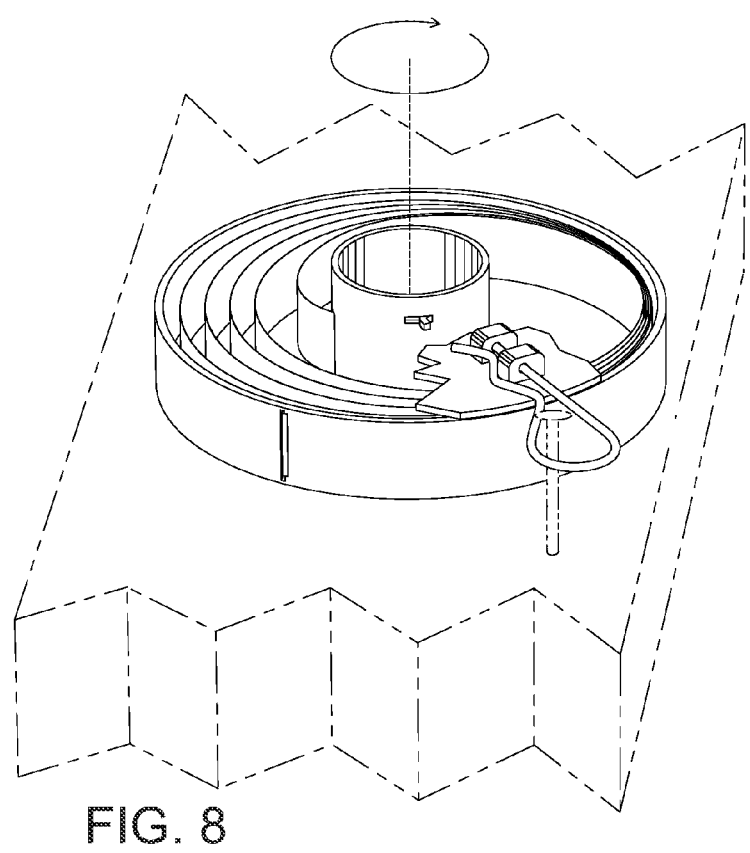
FIG. 8 depicts the same view as FIG. 7, except that the chock-pin has been moved to its unchocked position, and more of the lid of the housing has been cut away; the arrow above the axle portion shows the direction of the rotary torque exerted by the recoil spring after unchocking.
Figure 9:
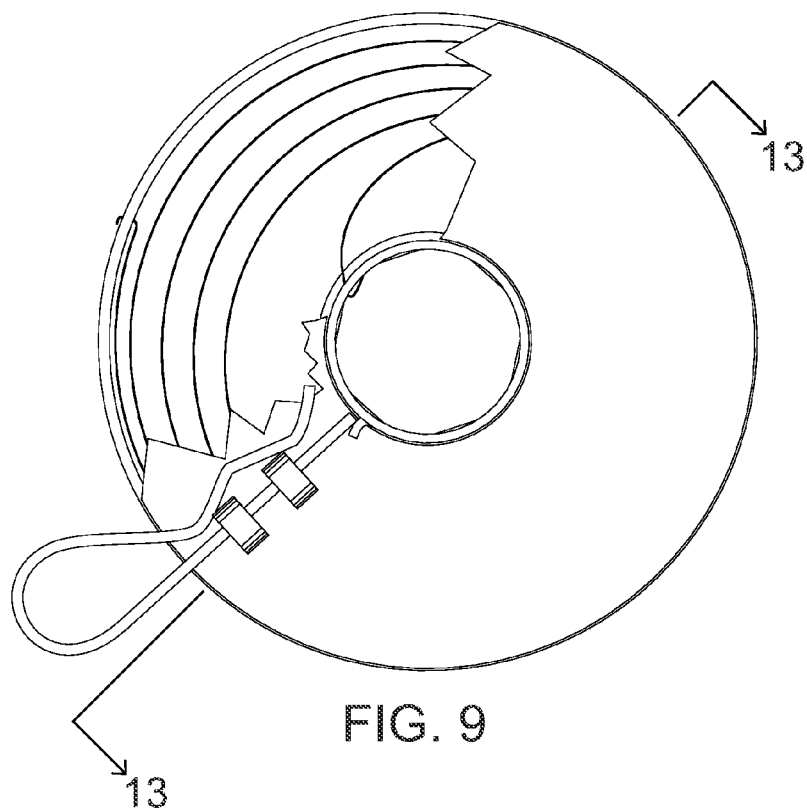
FIG. 9 depicts a top plan view of the invention of FIG. 7.
Figure 10:
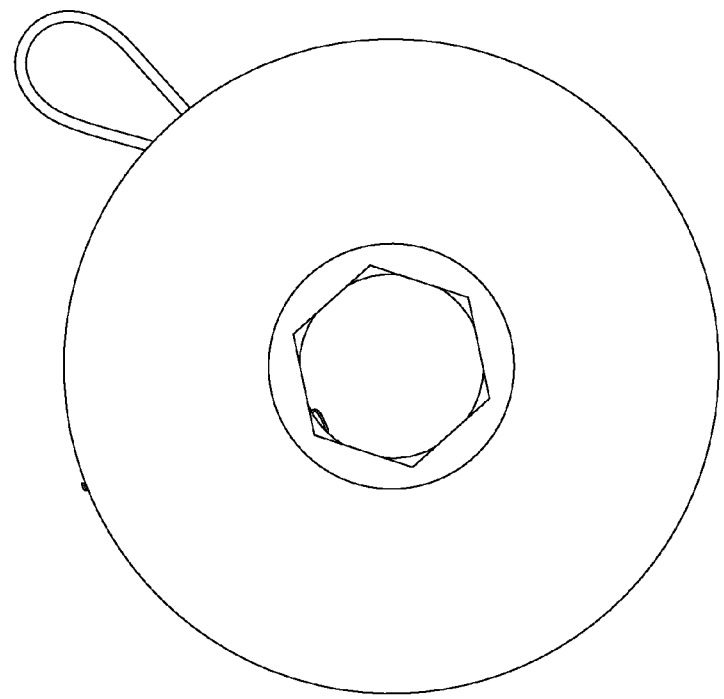
FIG. 10 depicts a bottom plan view of the invention of FIG. 7, absent the environmental elements.
Figure 11:
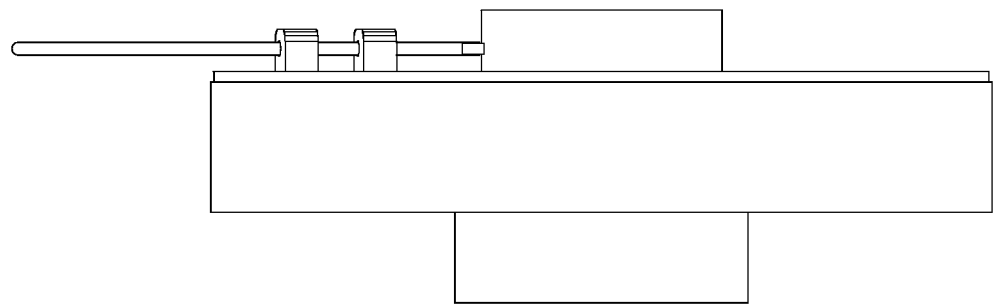
FIG. 11 depicts a first side elevation view of the invention of FIG. 7, absent the environmental elements.
Figure 12:
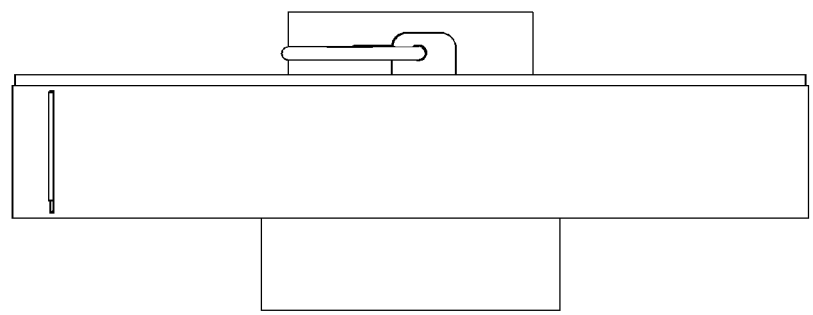
FIG. 12 depicts a second side elevation view of the invention of FIG. 7 (90° rotation from the view of FIG. 4), absent the environmental elements.
Figure 13:
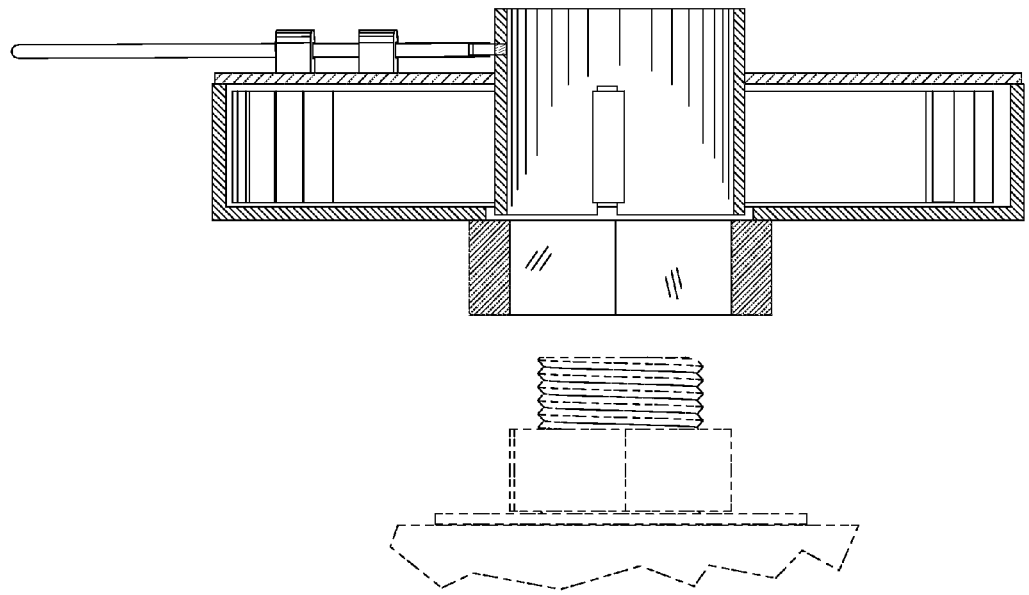
FIG. 13 depicts a cross-section view of the invention of FIG. 7, along the plane of 13-13 of FIG. 9; it is positioned above a representative sample of a nut and threaded rod (with washer atop a structural element), as if just prior to deployment atop the nut.
Figure 14:
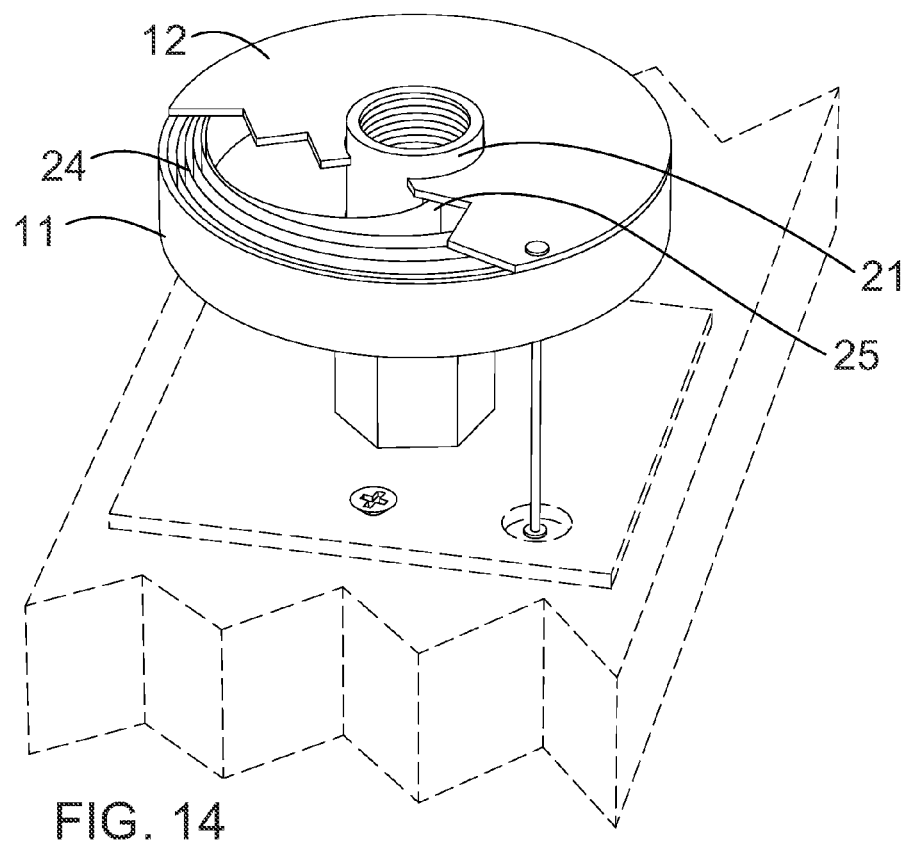
FIG. 14 depicts a perspective view of a representative sample of another embodiment of the invention having the nut incorporated into the coupling end, and with the stanchion (41) engaged within a void in substratum (dashed lines, in this case, a washer atop another substratum such as a wooden beam). The stanchion is engaged with the substratum when the recoil spring is tightly wound and ready to supply rotational force to the fastener portion of the system; the housing lid has been partially removed.
Figure 15:
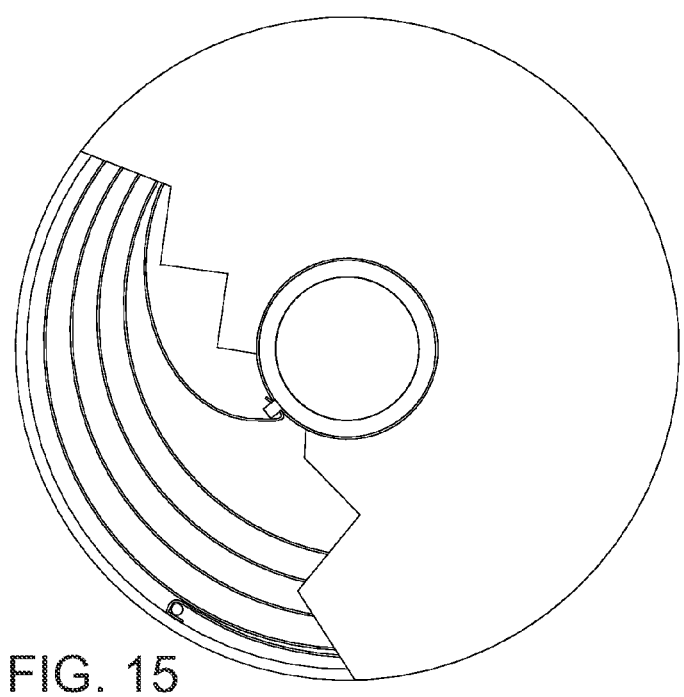
FIG. 15 depicts a top plan view of the invention of FIG. 14, except that the stanchion pin has been removed to show the aligned holes in the lid and bottom of the housing.
Figure 16:
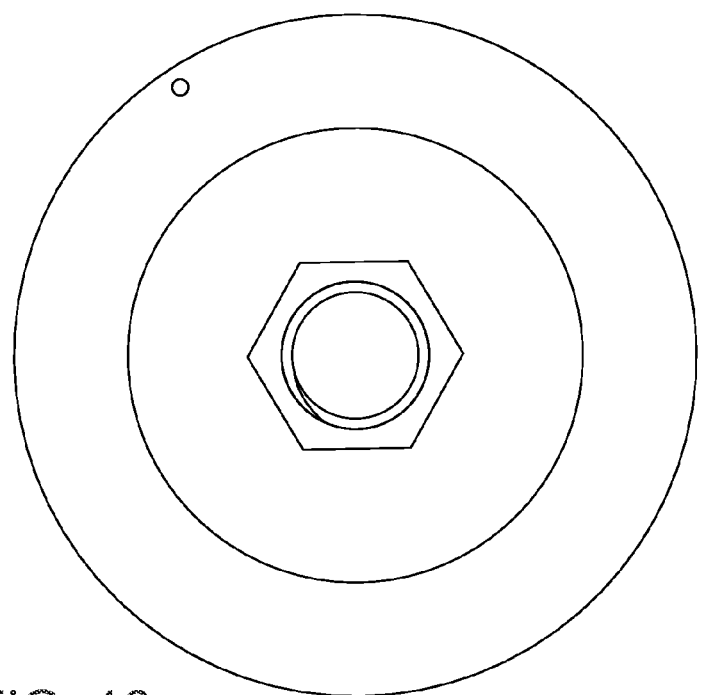
FIG. 16 depicts a bottom plan view of the invention of FIG. 15.
Figure 17:
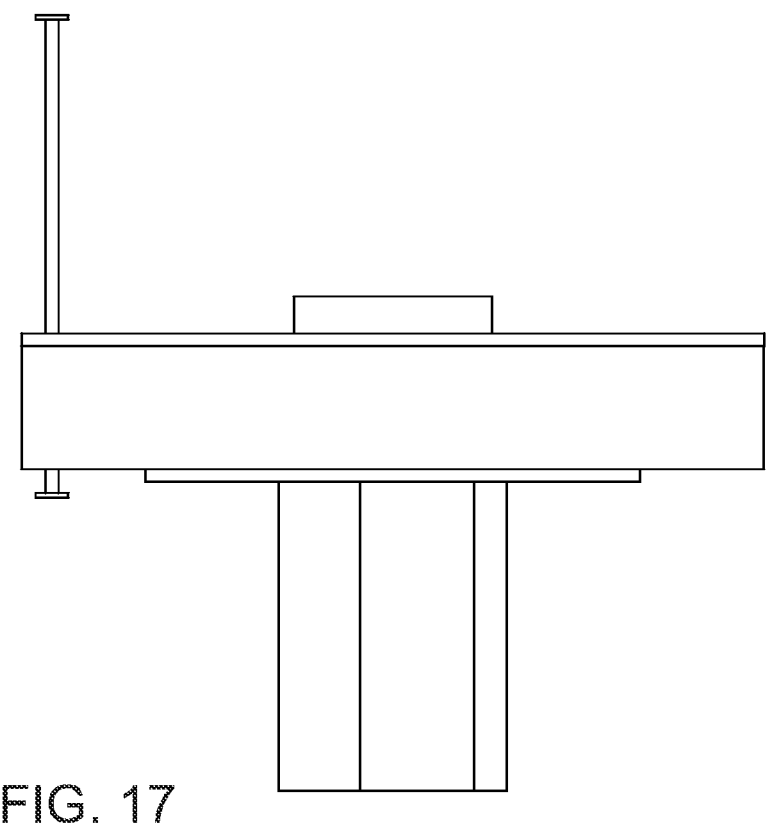
FIG. 17 depicts a side elevation view of the invention of FIG. 15, except that the stanchion has been added and positioned so that its upper end functions as a handle to facilitate winding the recoil spring (rather than the opposite end extended downwardly and engaging the substratum to prevent counter-rotation of the housing by the already-wound recoil spring).
Figure 18:
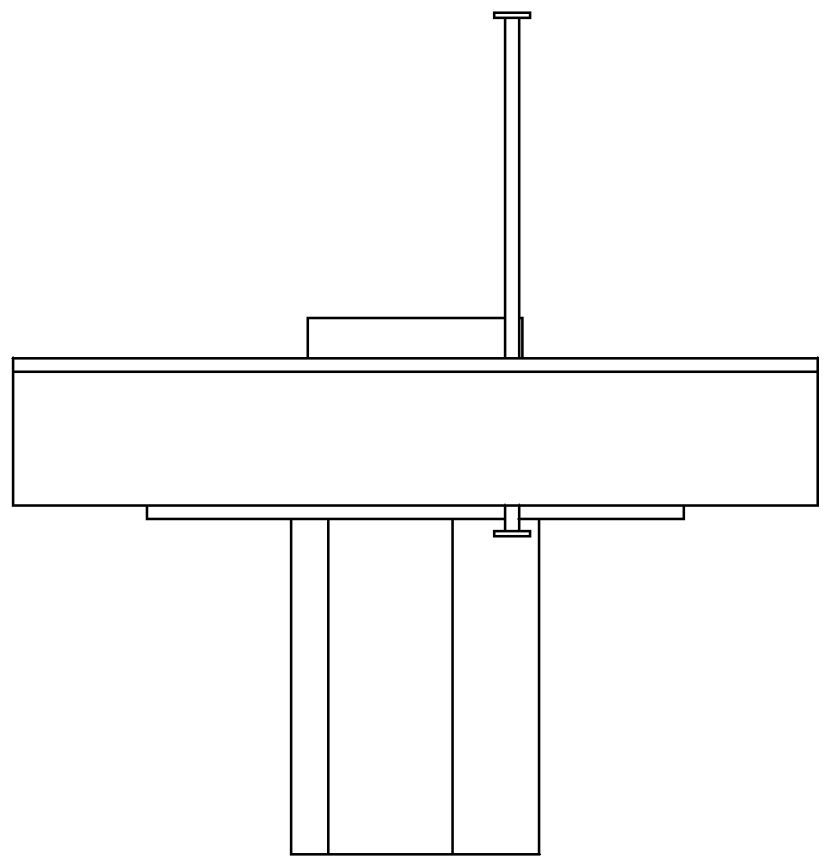
FIG. 18 depicts a second side elevation view of the invention of FIG. 17 (90° rotation from the view of FIG. 17).
Figure 19:
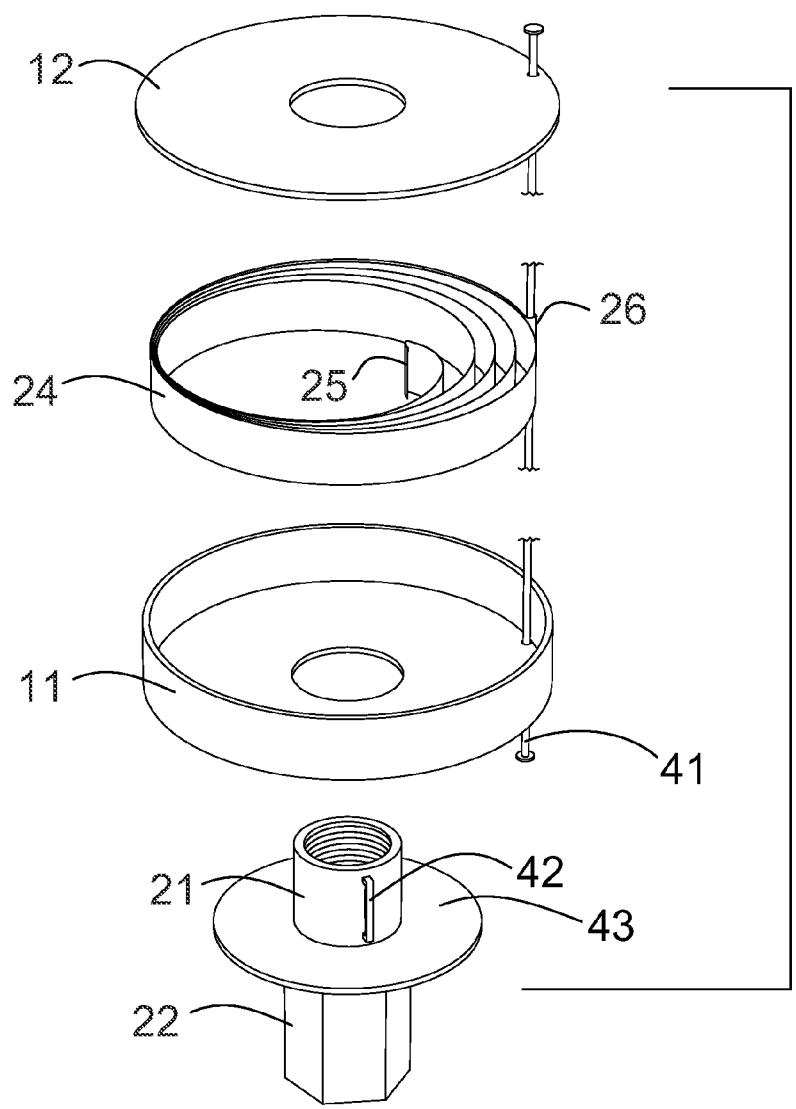
FIG. 19 depicts an exploded view of the parts of the invention of FIG. 14, absent the environmental elements. The lowermost part is a representative sample of internally threaded fastener means (22), an axle portion (21) with an anchor means (42) for the axial end of the recoil spring, and a support portion (43) to facilitate the carrying of the tightening means.

In general, one embodiment of the invention disclosed herein comprises a self-tightening rotary fastener (such as a nut) for the externally threaded portion of the fastening member (such as a threaded rod), for maintaining a snug fastening between said fastener and the substratum associated therewith. (See FIGS. 14-19.) In this embodiment, said fastener includes an internally threaded fastener means rotationally engageable with the fastening member; also included are a tightening means for applying rotational force directly to said fastener means, and a stop means for preventing counter-rotation of said tightening means in a tightened state.

The fastener means may include an axle portion for carrying said tightening means. A ledge or other outcropping between the round cross-sectioned axle portion and the non-round fastener portion facilitates the carrying of the tightening means. Alternatively, additional support such as a washer-like appendage may be engineered for that ledge. Moreover, said tightening means may include a recoil spring having an axial end anchored to said fastener means, and a peripheral end attached at a peripheral portion of a spring housing rotatably carried upon said axle portion. The peripheral end of said recoil spring may include a loop or similar structure to capture a middle portion of the stanchion extending (and travelable) through the housing. Rotation of said housing or counter-rotation of said fastener means causes said recoil spring to coil tighter into said tightened state.

The housing may have a lid with a hole, and a bottom with a hole aligned with said lid hole; both holes are sized to snugly accept a stanchion travelable therethrough and engageable with the substratum for preventing counter-rotation of said housing. The stanchion may have one end outstanding from said lid and facilitating counter-rotation of said housing, and an opposite engagement end engageable with the substratum. The engagement end may include an engagement tip insertable within a hole (or similar void) of the substratum. For example, there could be a metal plate between the internally threaded end of the fastener means and another substratum such as a wooden beam; the plate may have a hole in it, sized to accept the engagement end of the stanchion. Alternatively, the engagement end may have a point to facilitate being driven into wooden substratum. Alternatively, the engagement end may engage with a stop or similar structure upstanding on the substratum.

In one particular version of this embodiment, the self-tightening rotary fastener system comprises:

(a) an internally threaded fastener means rotationally engageable with the fastening member and comprising an axle portion;

(b) a tightening means comprising a recoil spring having an axial end anchored to said axle portion, and a peripheral end attached at a peripheral portion of a spring housing rotatably carried upon said axle portion, rotation of said housing or counter-rotation of said fastener means causing said recoil spring to coil tighter into a tightened state, said housing having a lid with a hole, and a bottom with a hole aligned with said lid hole; and (c) a stop means comprising a stanchion travelable through said aligned lid hole and bottom hole of said housing, and further comprising an engagement tip insertable within a void of the substratum for preventing counter-rotation of said housing.

To deploy this system, the user should first prepare the substratum stop for the stanchion when the device is installed. If the stopping method is engagement of the stanchion's engagement end with a void of the substratum, the user can create the void. One manner is to use a metal plate having a hole (sized to securely accept the engagement end), and position it between the internally threaded fastener end and the substratum; alternatively, the user may drill a similar hole in the substratum. If the stopping method is a stop or similar structure upstanding from the substratum (or intermediate plate), that stop structure may be readied for use.

The user then positions the stanchion with its upper end more above the housing lid, and with its engagement end closest to the bottom of the housing. The user then rotates the internally threaded fastener end onto the end of the threaded rod (or other externally threaded fastening member), until the fastener end is tightened snugly against the substratum (including any intermediate plate). The user then grasps the stanchion and circularly rotates the housing so that the recoil spring is tightly wound within it. Lastly, the user depresses the stanchion until the engagement end engages either the void or the stop of the substratum.

In general, another embodiment of the invention disclosed herein comprises a device for tightening the rotary fastener (such as a nut) on the threaded tip of the fastening member (such as a threaded rod), for maintaining a tight connection between the structural element(s) associated with the rotary fastener and the fastening member, said device including (comprising) a coupling means for coupling the device to the rotary fastener, a tightening means for applying rotational force directly to said coupling means for rotating the rotary fastener, and a chocking means for chocking and unchocking said tightening means in a counter-rotated state. The coupling means may include a coupling portion defining a coupling cavity snugly accepting the rotary fastener; it could further include an axle portion for carrying said tightening means. The tightening means may include a recoil spring having an axial end anchored to said coupling means, and a peripheral end attached to a peripheral portion of a spring housing rotatably carried upon said axle portion. Counter-rotation of said housing, or rotation of said coupling means, may cause said recoil spring to coil tighter into the counter-rotated state.

The housing may include a yoke on its outward surface, and the chocking means may include a chock-pin travelable through said yoke and engageable with a chocking portion of the coupling means. The chock-pin may include an axial tip; the chocking portion of the coupling means may include a portal accepting said axial tip of said chock-pin. The portal may be situated in the axle portion of said coupling means.

Alternatively, the chocking portion of the coupling means may include a protrusion outstanding from an outward surface of the axle portion, and engageable with the axial tip of the chock-pin. The protrusion may include a flange engageable with said axial tip of said chock-pin.

The device may further include a stop means for preventing rotation of the tightening means after unchocking of the chocking means. The stop means may include a stanchion upstanding from the structure and engageable with said tightening means. For example, a nail may be hammered partially into the structural element near the housing, with the head of the nail sufficiently exposed to catch the distal portion (or loop) of the chock-pin to prevent further rotation thereof.

A more specific version of this embodiment of the invention includes:
(a) a coupling means comprising a coupling portion defining a coupling cavity snugly accepting the nut on the threaded rod, and comprising an axle portion and a chocking portion;
(b) a tightening rotation means comprising a recoil spring within a housing rotatably carried upon said axle portion, said spring having an axial end anchored to said axle portion, and a peripheral end attached to a peripheral portion of said housing, said housing having a yoke on its outward surface;
(c) a chocking means for chocking rotation of said rotation means, comprising a chock-pin travelable through said yoke and engageable with said chocking portion of said coupling means; and
(d) a stop means for preventing rotation of said rotation means, comprising a stanchion upstanding from the structure and engageable with said rotation means.

The chock-pin may have an axial tip, said chocking portion of said coupling means comprising a portal accepting said axial tip of said chock-pin. The chock-pin may have an axial tip, said chocking portion of said coupling means comprising a protrusion engageable with said axial tip of said chock-pin. The protrusion may include a flange engageable with said axial tip of said chock-pin.

Besides the device described herein, the invention includes a method of using the device for tightening the rotary fastener (such as a nut) on the threaded tip of the fastening member (such as a threaded rod), comprising the steps of:
(1) rotating said housing or counter-rotating said coupling means until said recoil spring is tightly coiled;
(2) positioning said chocking means to prevent counter-rotation of said coupling means; and
(3) positioning said coupling cavity to snugly accept the nut rotatably engaged on the end of the rod.

The method may further include the steps of:
(4) engaging said stop means with said device; and
(5) unchocking said chock means.

I claim:

1. A self-tightening rotary fastener for the externally threaded portion of the fastening member for maintaining a snug fastening between said fastener and the substratum associated therewith, said fastener comprising:
(a) an internally threaded fastener means rotationally engageable with the fastening member;
(b) a tightening means applying rotational force directly to said fastener means; and
(c) a stop means for preventing counter-rotation of said tightening means in a tightened state.

2. The device of claim 1, wherein:
(a) said fastener means comprising an axle portion for carrying said tightening means; and
(b) said tightening means comprising a recoil spring having an axial end anchored to said fastener means, and a peripheral end attached at a peripheral portion of a spring housing rotatably carried upon said axle portion, rotation of said housing or counter-rotation of said fastener means causing said recoil spring to coil tighter into said tightened state.

3. The device of claim 2, said stop means comprising a stanchion, said housing having a lid with a hole, and a bottom with a hole aligned with said lid hole, both holes sized to snugly accept said stanchion travelable therethrough and engageable with the substratum for preventing counter-rotation of said housing.

4. The device of claim 3, said stanchion having one end outstanding from said lid and facilitating counter-rotation of said housing, and an opposite engagement end engageable with the substratum.

5. The device of claim 4, said engagement end comprising an engagement tip insertable within a void of the substratum.

6. The device of claim 4, said engagement end comprising an engagement tip engageable with a stop on the substratum.

7. The device of claim 3, said peripheral end of said recoil spring capturing said stanchion.

8. A self-tightening rotary fastener system for the externally threaded portion of the fastening member, for maintaining a snug fastening between said fastener and the substratum associated therewith, said fastener comprising:
(a) an internally threaded fastener means rotationally engageable with the fastening member and comprising an axle portion;
(b) a tightening means comprising a recoil spring within a housing rotatably carried upon said axle portion, said recoil spring having an axial end anchored to said axle portion, rotation of said housing or counter-rotation of said fastener means causing said recoil spring to coil tighter into a tightened state, said housing having a lid with a hole, and a bottom with a hole aligned with said lid hole; and
(c) a stop means comprising a stanchion captured by a peripheral end of said recoil spring and travelable through said aligned lid hole and bottom hole of said housing, said stanchion including an engagement tip insertable within a void of the substratum for preventing counter-rotation of said housing.

9. A device for tightening the rotary fastener on the threaded tip of the fastening member for maintaining a snug connection between the rotary fastener and the substratum associated therewith, said device comprising:

(a) a coupling means for coupling the device to the rotary fastener;
(b) a tightening means applying rotational force directly to said coupling means for rotating the rotary fastener; and
(c) a chocking means for chocking and unchocking said tightening means in a tightened state.

10. (initially filed) The device of claim 9, wherein:
(a) said coupling means comprising a coupling portion defining a coupling cavity snugly accepting the rotary fastener, and comprising an axle portion for carrying said tightening means; and
(b) said tightening means comprising a recoil spring having an axial end anchored to said coupling means, and a peripheral end attached to a peripheral portion of a spring housing rotatably carried upon said axle portion, rotation of said housing or counter-rotation of said coupling means causing said recoil spring to coil tighter into said tightened state.

11. The device of claim 10, said housing having a yoke on its outward surface, and said chocking means comprising a chock-pin travelable through said yoke and engageable with a chocking portion of said coupling means.

12. The device of claim 11, said chock-pin having an axial tip, said chocking portion of said coupling means comprising a portal accepting said axial tip of said chock-pin.

13. The device of claim 12, said portal situated in said axle portion of said coupling means.

14. The device of claim 11, said chock-pin having an axial tip, said chocking portion of said coupling means comprising a protrusion outstanding from an outward surface of said axle portion and engageable with said axial tip of said chock-pin.

15. The device of claim 14, said protrusion comprising a flange engageable with said axial tip of said chock-pin.

16. The device of claim 10, further comprising a stop means for preventing counter-rotation of said tightening means after unchocking of said chocking means.

17. The device of claim 16, said stop means comprising a stanchion upstanding from the structure and engageable with said tightening means.

18. A device for tightening the nut on the threaded rod for maintaining a tight connection between the structural element(s) anchored by the nut and rod, said device comprising:
(a) a coupling means comprising a coupling portion defining a coupling cavity snugly accepting the nut on the threaded rod, and comprising an axle portion and a chocking portion;
(b) a tightening rotation means comprising a recoil spring within a housing rotatably carried upon said axle portion, said spring having an axial end anchored to said axle portion, and a peripheral end attached to a peripheral portion of said housing, said housing having a yoke on its outward surface;
(c) a chocking means for chocking counter-rotation of said rotation means, comprising a chock-pin travelable through said yoke and engageable with said chocking portion of said coupling means; and
(d) a stop means for preventing counter-rotation of said rotation means, comprising a stanchion upstanding from the structure and engageable with said rotation means.

19. The device of claim 18, said chock-pin having an axial tip, said chocking portion of said coupling means comprising a portal accepting said axial tip of said chock-pin.

20. The device of claim 18, said chock-pin having an axial tip, said chocking portion of said coupling means comprising a protrusion engageable with said axial tip of said chock-pin.

21. The device of claim 20, said protrusion comprising a flange engageable with said axial tip of said chock-pin.

* * * * *